United States Patent [19]

Lacey

[11] 4,339,217
[45] Jul. 13, 1982

[54] EXPANDING ANCHOR BOLT ASSEMBLY
[75] Inventor: Patrick J. Lacey, Crestwood, N.Y.
[73] Assignee: Drillco Devices Limited, Long Island City, N.Y.
[21] Appl. No.: 166,640
[22] Filed: Jul. 7, 1980
[51] Int. Cl.³ .............................................. F16B 13/06
[52] U.S. Cl. ......................................... 411/55; 411/57
[58] Field of Search ....................... 411/57, 55, 44, 58, 411/64, 65

[56] References Cited

U.S. PATENT DOCUMENTS

| 1,850,768 | 3/1932 | Peirce | 411/55 |
| 4,011,786 | 3/1977 | Liebig | 411/57 |
| 4,137,816 | 2/1979 | Gartner | 411/2 |

FOREIGN PATENT DOCUMENTS

| 2613499 | 10/1977 | Fed. Rep. of Germany | 411/55 |
| 427015 | 5/1911 | France | 411/55 |
| 510113 | 8/1920 | France | 411/55 |
| 46-16210 | 5/1971 | Japan | 411/57 |
| 433671 | 9/1967 | Switzerland | 411/55 |
| 103932 | 2/1917 | United Kingdom | 411/57 |

Primary Examiner—Ramon S. Britts
Attorney, Agent, or Firm—Dowell & Dowell

[57] ABSTRACT

An expanding assembly to be inserted into and set within a preformed hole having a cylindrical portion extending inwardly from a wall surface and having a conical portion flared at a predetermined angle and located at a predetermined distance from the wall surface, the anchor assembly having a stud bolt carrying a cone at its inner end and being tensionable in the hole to displace the cone in the conical hole portion toward the mouth of the hole, the assembly having a sleeve surrounding the stud bolt and extending through the cylindrical hole portion into the conical portion to contact the cone, the sleeve being slotted to provide expanding legs which are longer than the conical hole portion, and the cone being almost as large in diameter as the cylindrical portion and being flared at an angle which is somewhat greater than said predetermined angle of the conical hole portion.

4 Claims, 3 Drawing Figures

U.S. Patent   Jul. 13, 1982   4,339,217
FIG. 1.
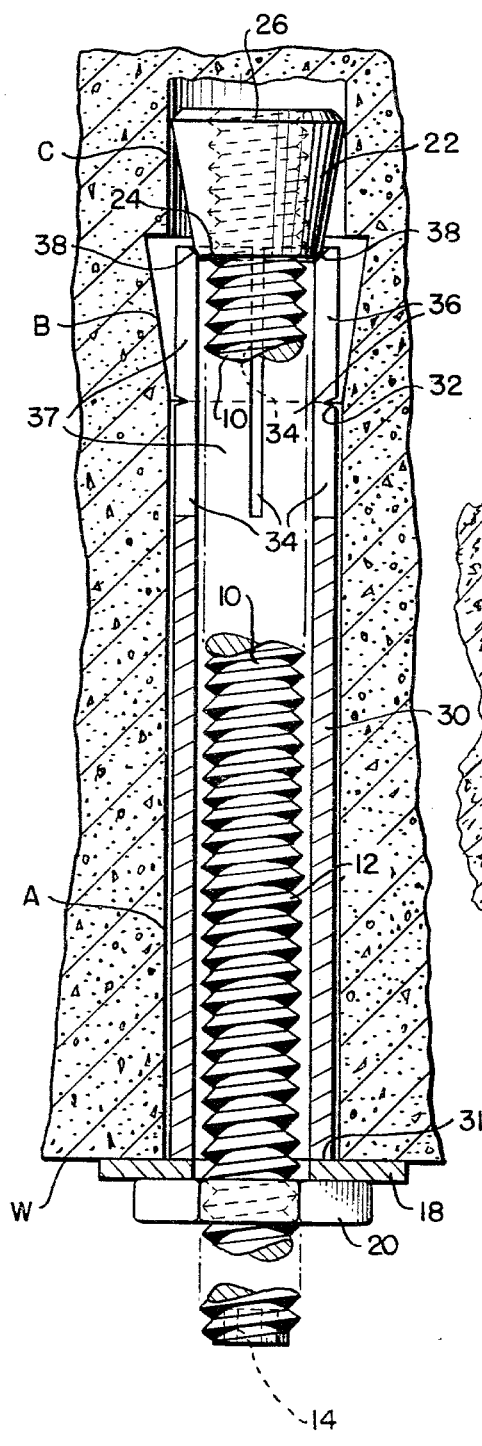
FIG. 3.
FIG. 2.
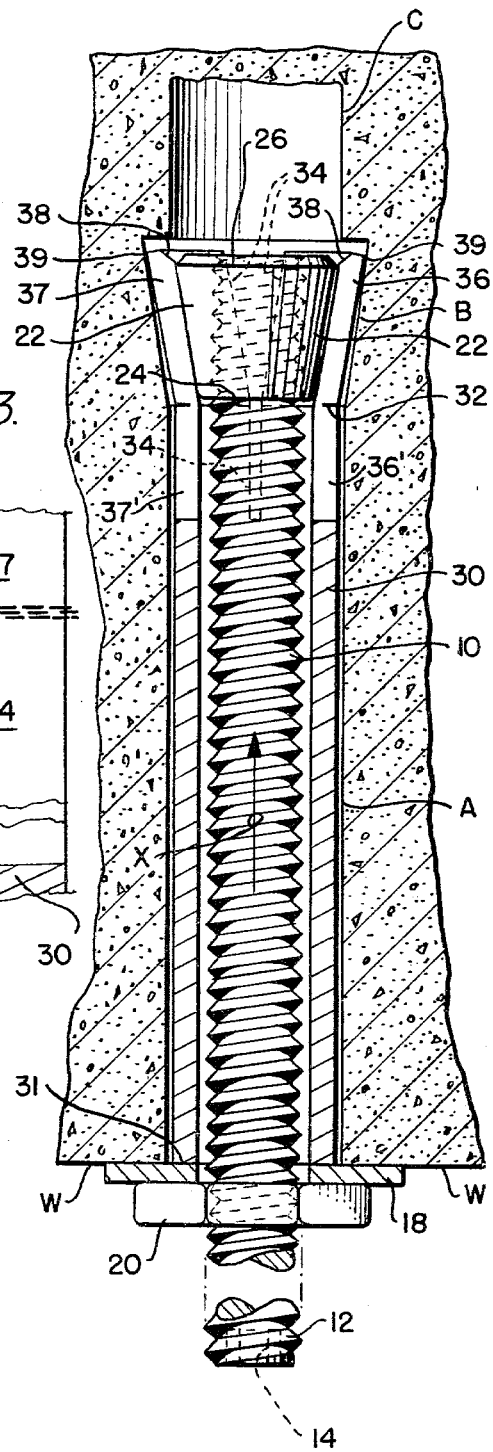

4,339,217

EXPANDING ANCHOR BOLT ASSEMBLY

FIELD OF INVENTION

This invention relates to an expanding anchor bolt assembly particularly intended for use in a pre-drilled hole in a concrete wall wherein the hole has a preformed flared portion into which the anchor bolt assembly expands when tightened.

BACKGROUND AND PRIOR ART

In the construction of masonry buildings, it is often necessary to anchor metal framework within the building after the concrete work has been completed. The practice at the present time is to drill blind holes into the concrete walls and insert expansion bolts which when tightened expand sufficiently to somewhat distort the walls of the holes and thereby anchor to them. However, it has been the experience of the prior art that over a period of time this type of anchor assembly loosens, and may be rather easily withdrawn from the hole. The loosening occurs partly as a result of relaxation of the contact pressures built up by a very small increment of expansion, and partly as a result of vibrations in the building over a period of time. This is particularly to be avoided in the case of power plants, and study has been put into making a more secure expansion bolt assembly which will not relax its grip over a period of time.

The present invention provides an anchor bolt of a general type which is well-known in the prior art. Typical examples of such anchor bolts are shown in U.S. Pat. Nos. 1,850,768 to Peirce and 4,137,816 to Gartner.

U.S. Pat. No. 4,011,786 to Liebig shows a structure in which the expansion sleeve is slotted, and has an annular groove around it where the leg portions join the cylindrical portions so as to facilitate expansion of the legs when the cone is drawn into them.

Copies of these three patents are included with this application as originally filed.

THE INVENTION

The invention comprises an expanding anchor assembly to be inserted and set within a preformed hole having a cylindrical portion which extends inwardly from a wall surface at the mouth of the hole, and which has a conical flared portion beginning at a predetermined distance from the mouth of the hole and flaring at a predetermined angle so that the conical portion enlarges toward the inner end portion of the hole which extends beyond the conical portion. The flare of the conical hole portion is 9 degrees in the practical embodiment as currently used.

The expanding anchor bolt assembly itself comprises an elongated stud bolt surrounded by a sleeve which is slotted at its end which is closest to the inner end of the preformed hole. The stud bolt carries a cone located at the inner end of the anchor bolt assembly and fixed to the stud bolt which is threaded at its outer end and carries a nut and washer in a manner well-known per se. The stud bolt passes snugly through the sleeve which is of such length as to reach from the outer wall surface substantially to the innermost end of the conical flared portion of the hole, the legs of the slotted sleeve having an annular groove therearound located opposite the intersection of the smaller end of the flared portion of the hole with the cylindrical portion thereof to facilitate sharper bending of the legs to follow the contour of the flared hole. The cone of the anchor assembly is large enough so that it is a close sliding fit within the hole, and the diameter of the sleeve portion is somewhat smaller and is a somewhat looser fit in the hole. The flare angle of the cone, which is carried at the inner end of the stud bolt, is slightly greater than the flare of the hole, namely about 10.5 degrees, and the slots which form the legs of the sleeve extend a substantial distance outwardly beyond the annular groove toward the mouth of the hole.

OBJECTS AND ADVANTAGES OF INVENTIONS

It is a principle object of this invention to provide an expanding anchor bolt assembly which accurately fills and faithfully conforms with the shape of a preformed hole having a conical flared portion near its inner end the flared portion serving the purpose of providing a very positive and secure engagement between the anchor bolt and the walls of the hole. Particularly when setting anchor bolts in concrete walls, it must be noted that the concrete hole itself is rather imperfect, for instance as compared with a hole drilled in a metal plate. Anchor bolts which have been used in the past in purely cylindrical shaped holes tend when tightened to give the appearance of being firmly set when in fact they are merely hung up on some imperfection within the hole with most of the anchoring area not fully set at all. Moreover, the setting of this type of anchor bolt within a cylindrical hole having no conical portion relies upon a very small displacement of the concrete by the metal to produce sufficient friction to maintain the anchor in place. This has not been a practical approach, and because of the poor holding capability of such an anchor it has been necessary to overstress the stud bolt itself in an effort to be sure that the anchor is adequately set, whereupon the stud bolt is weakened, often to the point of near failure, before any exterior load is placed upon it by the structures being mounted to the wall. The present invention sets the anchor mainly within the conical flared portion of the hole by the stud bolt pulling the wedge into the anchor sleeve and expanding the legs of the sleeve outwardly so that they fill the conical portion of the hole. The main purpose of the sleeve material at the legs is to occupy the space between the anchor cone and the conical flared portion of the hole so as to anchor the cone itself securely at the flared portion of the hole, all of the load then being placed upon the stud bolt. The remaining length of the sleeve is merely used to locate the legs at the proper position with respect to the flared portion of the hole while the anchor is being expanded and set.

It is a further major object of the invention to extend the slots which form the legs in the anchor sleeve outwardly along the sleeve toward the mouth of the hole beyond the portion of the sleeve which is opposite to the conical flared portion of the hole. This is a substantial improvement in the anchor structure, because it insures that the portion of the sleeve lying between the cone and the washer at the outer end of the assembly will not be placed in high compression due to the pulling of the cone into the leg portion. It was found that when the slots extended down the sleeve no further than the annular groove opposite the smaller end of the conical flared portion of the hole, the smaller end of the cone tended to hang up inside the unslotted portion of the sleeve gouging into its sidewalls, and thereby attempting to compress the sleeve between the small end of the cone and the washer. Such an occurrence not only fails to increase the holding power of the anchor since no expansion occurs in a desired location, but the effect is to put the unslotted portion of the sleeve into a high state of compression, thereby making it falsely appear that the anchor is fully set when, in fact, the tensioning of the stud bolt is only serving to uselessly compress the sleeve. Sometimes this compression tends to split the sleeve, but in all cases this compression further tensions the stud bolt itself and brings it closer to ultimate failure without providing any benefit. By extending the slots well outwardly of the sleeve portion beyond the annular groove at the beginning of the tapered portion of the hole, the sleeve is left free to continue to expand, whereby it is only slightly compressed longitudinally, and undesirable pre-stressing of the stud bolt is eliminated. The above described compression of the sleeve to give a false impression that the anchor is well set is more likely to occur in a hole drilled in a concrete wall, because the hole is imperfect. If the hole were a precision hole, then the anchor would set precisely as shown in the drawings accompanying this disclosure. However, the actual diameter of the hole varies considerably depending upon the condition of the drill bit, the type of concrete in which the hole is being drilled, and the skill of the workmen performing the drilling operation, and this variation in hole diameter causes a variation in the axial position in the hole where the cone will finally come to rest.

It is another major object of this invention to provide an anchor in which any failure which occurs as a result of pull tending to extract the anchor bolt from the hole will occur in the stud bolt itself, rather than in the concrete. It is for this reason that the conical tapered portion of the hole is located deep within the hole, and not near the outer wall surface. The conical portion of the hole at present is being undercut with a 9 degree taper, whereas the taper of the cone portion of the anchor is machined to be about 10.5 degrees. As a result, when the stud bolt is tensioned to pull the tapered cone inside of the leg portions and spread them into contact with the conical portion of the hole, the cone spreads the legs so that they initially contact the conical portion of the hole near its larger-diameter inner end. This is done so that the anchor will be sure to provide at least as great a holding pressure at the larger end of the conical portion of the hole as at the smaller end. It was found that when the cone was made to have the same taper as the hole, the contact pressure tended to be greatest near the smaller end of the conical hole, whereby the holding power was diminished and wasted near the larger end of the cone where the potential holding area is the greatest. By providing an anchor cone which has a steeper taper than the conical hole, the leg portions are driven into tight contact with the conical walls of the hole substantially along their full length. This is because the cone moves between the leg portions with a wedging action that causes a flow of metal and compression of the concrete to achieve a progressive setting of the leg portions from their innermost ends toward the annular groove in the sleeve. To achieve proper setting of the leg portions against the concrete in the conical portion of the hole, the stud bolt should be tensioned to about 80% of the minimum specified yield strength of the steel in the stud bolt. This is a tension at which the cone is adequately wedged but has not been pulled into the sleeve beyond an optimum position. The materials of the cone and of the leg portions, as well as the concrete around the cone, are all distorted, but to an optimum degree which still leaves sufficient tensile strength in the stud bolt to support the external structure which is being attached to it at the face of the wall. By making the anchor bolt cone about 1.5 degrees greater taper than the walls of the hole it is found that, when the anchor parts and the wall are distorted to a final position, the pressure of the legs on the conical hole portion is about equal along the length thereof. The stud bolt is provided with internal hexagonal flats in its head so that it can be held against rotation while the nut is being tightened.

It is another object of the invention to provide an anchor bolt assembly in which materials are used which provide correct characteristics and relative strengths. For instance, the cone at the end of the stud bolt must be sufficiently hard that it can not be extruded through the sleeve when the stud bolt is too highly tensioned. Moreover, the sleeve material must not be so brittle that it will snap off at the annular groove and free the legs from the remainder of the sleeve. The annular groove extends about 10 percent into the wall thickness. At the present time anchor bolt assemblies are being manufactured having a range of stud bolt diameters extending from $\frac{1}{4}$ inch through 1 inch, the various sizes of assemblies maintaining approximately the proportions shown in the accompanying drawings.

Still another important object of the invention is to provide an expanding anchor bolt assembly wherein the expansion at the larger end of the conical flared portion of the hole is at least as great and achieves at least as high a unit pressure of the legs against the conical wall portions as is attained at the smaller end of the cone. This is desirable because the concrete area at the larger end of the conical portion is greater than at the smaller end, and therefore the concrete is less likely to fail due to compression at the larger end of the conical portion than at its smaller end. As stated above, every effort has been made to provide an anchor bolt assembly wherein ultimate failure occurs by breaking of the stud bolt, rather than by fracturing the walls of the concrete hole.

Other objects and advantages of the invention will become apparent during the following discussion of the drawing.

THE DRAWING

FIG. 1 is a sectional view taken through a preformed hole in a concrete wall and showing an anchor assembly according to this invention inserted therein, but not tightened to begin expansion; and FIG. 2 is a view similar to FIG. 1 but showing the anchor tightened almost to its set position, but somewhat short of fully set.

FIG. 3 is an enlarged fragmentary view corresponding to a portion of FIG. 1.

DESCRIPTION OF PREFERRED EMBODIMENT

Referring now to the figures of the drawing, FIGS. 1 and 2 show a hole which has been preformed in a concrete wall W. The hole has an elongated cylindrical portion A extending inwardly from the mouth of the hole at the wall W, and meeting a conically flared hole portion B which flares at an angle of 9 degrees so that it enlarges toward the innermost end of the hole. From the conically flared portion B the hole continues with another cylindrical portion C which is of the same diameter as the portion A of the hole. The hole illustrated in FIGS. 1 and 2 is blind, but the hole might also continue on through the wall. It should be noted that the conical flared portion B of the hole is spaced from the wall W by a very exact distance, this type of hole being formable in a wall by first drilling the cylindrical portions with a drill bit and then undercutting the hole to form the conical portion B using a tool of the type shown in copending application, now U.S. Pat. No. 4,307,636 issued on Dec. 29, 1981 to Patrick J. Lacey.

FIG. 1 shows an assembly for an expanding anchor bolt made according to the present invention. The assembly includes a stud bolt 10 which is fully threaded as at 12, and having a hexagonal socket 14 which can be used to prevent rotation of the stud bolt while a nut 20 is being tightened on the stud bolt. The hexagonal socket could of course be replaced by a screwdriver slot in a manner well-known per se. The stud bolt 10 carries a cone 22 located at the innermost end of the stud bolt. The cone 22 is shown threaded onto the stud bolt 10, although it could be integrally formed on the stud bolt or otherwise attached thereon. In the case where the cone is threaded onto the stud bolt, since the stud bolt is tensioned by tightening a nut located outside the hole, it will be necessary to deform the threads inside the cone, or else to use epoxy or some other adhesive on the threads inside the cone so as to prevent any relative rotation between the stud bolt and the cone 22.

The stud bolt 10 is surrounded by a metal sleeve 30 which has an annular groove 32 extending into its outer surface about 10 percent of the way through its wall thickness, the groove being shown deeper in FIG. 1 for the sake of emphasis, but being shown in proportion in FIG. 3. The groove 32 is spaced from the outermost end 31 of the sleeve 30 by the same distance that the beginning of the conical portion B of the hole is spaced from the wall W.

The sleeve 30 has an annularly-spaced series of longitudinal slots 34 extending parallel to the axis X of the assembly from the inner end of the sleeve outwardly to a point beyond the annular groove 32 and toward the outer end 31 of the sleeve, thereby dividing the sleeve into leg portions 36 and 37 as shown in FIGS. 1 and 2. At least three such slots 34 are desirable, and in the manufactured version of the anchor 4 slots are used as shown in the drawing. The outer ends of the legs are chamfered as at 38 so as to guide entry of the cone into the sleeve portion. A washer 18 is inserted under the nut 20 and abuts the outer end of the sleeve 31 so as to maintain the end of the sleeve 31 even with the face of the concrete wall W during setting of the bolt assembly in the wall.

The taper of the cone 22 between its smaller end 24 and its larger end 26 is 10.5 degrees in the embodiment as manufactured, somewhat greater than the 9 degrees taper of the conical portion B of the hole in the wall. As a result, as can be seen best in FIG. 2, when the nut 20 is tightened to tension the stud bolt 10 and pull the cone 22 into the sleeve to thereby expand the legs 36 and 37, the legs begin touching the conical wall portion B of the hole in the vicinity of their innermost chamfered ends 38, namely at the contact points marked 39 in FIG. 2, while the leg portions located nearer the annular groove 32 are still out of contact with the conical wall portion B. This is done to cause the leg portions 36 and 37 to set against the conical wall portion B from the innermost end of the anchor at 39 progressively outwardly of the hole toward the annular groove 32. In this way, the walls of the conical portion B of the hole are expanded initially, and ultimately most extensively, near the larger end of the conical hole portion, i.e. furthest from the mouth of the hole at the wall W. Ultimately, the hole becomes somewhat expanded near its larger conical end as the concrete is compressed by the legs 36 and 37, whereby after final setting of the anchor bolt assembly, the flare of the hole portion B will be increased somewhat beyond 9 degrees. It was found that if the cone 22 were made so that its flare was equal to the flare of the conical portion of the hole B, the tightest compression of the concrete by the expanding legs would occur near the smaller end of the flared portion B, and there would be only a relatively lesser gripping action near the larger diameter portion of the flared hole B.

As mentioned above, the view in FIG. 2 shows the anchor just before final setting occurs. During this final setting the cone 22 will move further outwardly into the sleeve 30 until the leg portion 36 and 37 fully set against the wall of the conical portion B of the hole along substantially its full length. At the time of final setting, the portions of the legs labelled 36' and 37' will also have flared slightly so that these leg portions in the vicinity of the annular groove 32 will have moved out into contact with the wall of the hole in the vicinity of the junction of the cylindrical portion A with the conical portion B. If the hole in the concrete wall is precisely the right diameter at each point, the cone 22 should stop with its smaller end 24 just even with the annular groove 32. However, if the hole is somewhat oversized the cone can be pulled still further into the sleeve and slightly beyond the annular groove since the slots 34 also extend therebeyond. Conversely, if the hole in the concrete wall is slightly undersized, the smaller end 24 of the cone will stop short of the annular groove 32 as the nut 20 is tightened to the predetermined torque.

A typical set of dimensions for an anchor bolt assembly using a half inch diameter stud bolt 10 is as follows: the sleeve 30 including the leg portion 36 and 37 is 4 inches long; the diameter of the cylindrical portions A and C of the concrete hole is 0.75 inch nominal; the diameter at the larger end of the cone 22 at 26 is about 0.748 inch; the outer diameter of the sleeve 30 is 0.709 inch and its nominal wall thickness is 0.095 inch; and the annular groove 32 is V-shaped and cut at about a 20 degree angle into the side wall of the sleeve to a depth of about 0.010 inch.

The present invention is not to be limited to the exact form shown in the drawings, for obviously changes can be made within the scope of the following claims.

I claim:

1. An expanding anchor and structural wall assembly, said assembly comprising:
   (a) a structural wall having a preformed hole having a cylindrical portion extending inwardly from the mouth of the hole at a surface of the wall, and the hole having a conical flared portion beginning at a predetermined distance from said mouth and flaring at a predetermined angle to the longitudinal axis of the hole so that the conical portion enlarges toward the inner end portion of the hole; and
   (b) an expanding anchor comprising, a threaded bolt extending through said cylindrical portion and into said conical portion of the hole;
   a cone carried by the bolt and being of such diameter as to be snugly insertable through said cylindrical portion of the hole into the conical portion, the flare of the cone being at a greater angle with respect to said axis than the predetermined angle of the flared portion of the hole;

headed means carried by the bolt outside the hole and tightenable against the wall surface to displace the cone in said conical portion toward the mouth of the hole;

a sleeve surrounding the bolt between the cone and the headed means and being of length commensurate with the combined lengths of the cylindrical and conical portions of the hole and having an outer diameter sized to slide in the cylindrical portion of the hole, the sleeve having multiple longitudinal slots through its side walls which are spaced apart annularly about the sleeve and which pass through the inner end of the sleeve which is adjacent to the cone and the slots extending parallel to the bolt away from the cone toward the outer end of the sleeve;

the sleeve having an annular groove extending circumferentially around its outer surface and spaced from said outer end of the sleeve toward the cone by a distance equal to the length of the cylindrical portion of the hole, the groove extending partway into the thickness of the side wall of the sleeve and intersecting the slots; and the slots extending from the inner end of the sleeve nearest the cone through the groove and beyond it toward the headed means.

2. An expanding anchor assembly as claimed in claim 1, wherein the conical portion of the hole is flared at about 9 degrees and the flare of the cone is about 10.5 degrees.

3. An expanding anchor assembly as claimed in claim 1, wherein the annular groove extends about 10% into the thickness of the side wall of the sleeve.

4. In an expanding anchor assembly as claimed in claim 1, the wall thickness of the sleeve and the longitudinal length of the cone being selected relative to the diameter of the cylindrical portion of the hole and the flare of the conical portion of the hole such that when the cone is displaced into the sleeve so that the legs touch the walls of said conical hole portion, the end of the cone nearest the mouth of the hole will be substantially even with the annular groove around the sleeve.

* * * * *